(12) United States Patent
Anderson et al.

(10) Patent No.: US 8,491,798 B2
(45) Date of Patent: Jul. 23, 2013

(54) ELIMINATING HYDROGEN SULFIDE FROM LIQUID AMMONIA

(75) Inventors: Mark C. Anderson, Spring, TX (US); Michael F. Ray, Spring Branch, TX (US)

(73) Assignee: ThioSolv, LLC, Spring Branch, TX (US)

( * ) Notice: Subject to any disclaimer, the term of this patent is extended or adjusted under 35 U.S.C. 154(b) by 0 days.

(21) Appl. No.: 13/419,244

(22) Filed: Mar. 13, 2012

(65) Prior Publication Data

US 2012/0237430 A1    Sep. 20, 2012

Related U.S. Application Data

(60) Provisional application No. 61/465,041, filed on Mar. 14, 2011.

(51) Int. Cl.
   *C01C 1/02* (2006.01)
   *C02F 1/68* (2006.01)

(52) U.S. Cl.
   USPC .................. 210/749; 423/352; 423/514

(58) Field of Classification Search
   USPC .................. 423/352, 514; 210/749
   See application file for complete search history.

(56) References Cited

U.S. PATENT DOCUMENTS

| | | | |
|---|---|---|---|
| 1,079,291 A | 11/1913 | Feld | |
| 2,898,190 A | 8/1959 | Grosskinsky et al. | |
| 3,431,070 A | 3/1969 | Keller | |
| 3,524,724 A | 8/1970 | Every et al. | |
| 3,584,042 A | 6/1971 | Yavorksy et al. | |
| 3,627,465 A | 12/1971 | Hamblin | |
| 3,635,820 A | 1/1972 | Urban | |
| 3,773,900 A | 11/1973 | Roberts et al. | |
| 3,833,714 A | 9/1974 | Renault et al. | |
| 3,859,414 A | 1/1975 | Urban | |
| 4,008,310 A | 2/1977 | Gorin | |
| 4,478,807 A | 10/1984 | Ott | |
| 4,579,727 A | 4/1986 | Cronkright et al. | |
| 4,960,575 A | 10/1990 | Bedell et al. | |
| 4,960,676 A | 10/1990 | Mochiji et al. | |
| 5,618,658 A | 4/1997 | Penman et al. | |
| 6,159,440 A | 12/2000 | Schoubye | |
| 6,534,030 B2 * | 3/2003 | Anderson et al. | ............. 423/514 |
| 6,605,263 B2 | 8/2003 | Alix et al. | |
| 6,818,194 B2 | 11/2004 | DeBerry et al. | |

(Continued)

FOREIGN PATENT DOCUMENTS

| | | |
|---|---|---|
| EP | 0928774 | 7/1999 |
| WO | 02081370 A1 | 10/2002 |
| WO | 03002455 A1 | 1/2003 |
| WO | 2007137143 A2 | 11/2007 |

OTHER PUBLICATIONS

International Search Report & Written Opinion dated Aug. 31, 2012 for co-pending PCT patent app. No. PCT/US12/28936.

(Continued)

*Primary Examiner* — Timothy Vanoy
(74) *Attorney, Agent, or Firm* — D'Ambrosio & Menon, PLLC

(57) ABSTRACT

Processes for selectively eliminating hydrogen sulfide from liquid ammonia, either anhydrous or aqueous, are described herein. The processes generally include contacting a first liquid stream, anhydrous or aqueous, comprising ammonia and hydrogen sulfide, with a solution comprising sulfur dioxide to convert the hydrogen sulfide to thiosulfate.

11 Claims, 1 Drawing Sheet

U.S. PATENT DOCUMENTS

| | | | |
|---|---|---|---|
| 7,052,669 B2 * | 5/2006 | Schoubye et al. | 423/514 |
| 7,390,470 B2 | 6/2008 | Anderson et al. | |
| 7,575,732 B2 | 8/2009 | Anderson et al. | |
| 7,655,211 B2 | 2/2010 | Anderson et al. | |
| 2003/0039606 A1 * | 2/2003 | Schoubye et al. | 423/514 |
| 2003/0072707 A1 | 4/2003 | Ray et al. | |
| 2003/0223930 A1 | 12/2003 | Schoubye et al. | |

OTHER PUBLICATIONS

CHEVRON; Waste Water Treatment; 2012; http://www.chevron.com/products/sitelets/refiningtechnology/waste_wtr_treat_6b.aspx.

* cited by examiner

ELIMINATING HYDROGEN SULFIDE FROM LIQUID AMMONIA

CROSS-REFERENCE TO RELATED APPLICATION(S)

This application claims priority under 35 U.S.C. §119(e) to U.S. Provisional Patent Application Ser. No. 61/465,041 filed on Mar. 14, 2011, which is incorporated herein by reference in its entirety.

BACKGROUND

Hydrogen sulfide ($H_2S$) and ammonia are commonly found together in process streams produced in commercial processes such as petroleum refining and gasification of carbon-containing materials such as coal, petroleum coke, and heavy oils. Conventionally, the ammonia is removed from gaseous or liquid streams immiscible with water by washing with water and subsequent separation of the phases. Dissolution of the ammonia in the wash water also renders soluble a roughly equimolar amount of hydrogen sulfide. Because of the toxicity of hydrogen sulfide, waste waters containing hydrogen sulfide ("sour water") must be treated before discharge or reuse. If the liquid stream is to be discharged to public waters, the ammonia must also be removed.

Typically, sour water is treated by distillation to remove both hydrogen sulfide and ammonia as a gaseous mixture. The gas mixture may be further treated in a Claus process, an industry standard for recovery of elemental sulfur. The ammonia in the gas mixture is incinerated in the Claus process to form water and nitrogen gas. Alternatively, sour water may be treated by taking advantage of the fact that the ratio of partial pressure of hydrogen sulfide to the partial pressure of ammonia over water solution increases with increasing temperatures. The sour water is treated under elevated pressure in a two-part distillation process. The first distillation strips out most of the hydrogen sulfide and minor amounts of ammonia as an overhead gas product, which may be further treated with a Claus process. The second distillation produces an overhead gas stream, comprising ammonia with minor amounts of hydrogen sulfide, and a bottoms water stream suitable for discharge or reuse.

SUMMARY

The one or more embodiments of the invention provide a process for efficiently eliminating hydrogen sulfide in a fluid which comprises ammonia by converting the hydrogen sulfide to ammonium thiosulfate, which has commercial value. The processes of the invention reduce the cost of removing hydrogen sulfide in comparison to physical separation or reactive solvents. The ammonium thiosulfate and ammonia products are marketable, which can offset process costs.

In one embodiment, the process comprises contacting, in a first contact zone, a first liquid stream, anhydrous or aqueous, comprising ammonia and hydrogen sulfide ("sour ammonia") with a second stream, liquid or gas, comprising sulfur dioxide. The first contact zone produces a liquid effluent comprising ammonia and ammonium thiosulfate. The first contact zone also yields an overhead gas comprising ammonia and sulfur dioxide and insoluble and inert gaseous compounds that may have been present in the second stream. Water may be added to the first contact zone if necessary to satisfy the stoichiometric demand for one mol of water per each two mols of hydrogen sulfide converted to thiosulfate or to prevent precipitation of ammonium thiosulfate salt.

In another embodiment of the invention, the first contact zone overhead gas is sent to a second contact zone where it is washed by a scrub solution comprising at least one of water and a dilute ammonium sulfite solution. At least a portion of the second contact zone liquid effluent, comprising ammonium sulfite and ammonium bisulfite, may be recycled to the first contact zone In another embodiment, the process comprises diverting at least a portion of the first contact zone liquid effluent to an evaporator that separates the effluent into an evaporator overhead gas product comprised of ammonia commercially free of hydrogen sulfide and an evaporator liquid effluent product comprised of ammonium thiosulfate.

To increase the ratio of thiosulfate to ammonia exiting the first contact zone in the liquid effluent, hydrogen sulfide concentration in the feed may be increased. One method of increasing the hydrogen sulfide concentration is by adding hydrogen sulfide to the feed or directly to contact zone. Another means of increasing the ratio of sulfur to ammonia in the product is to reduce the separation of hydrogen sulfide from the ammonia sulfur in a preceding distillation step. Another means of increasing to the desired level the ratio of sulfur to nitrogen in the first contact liquid effluent, is by adding ammonium thiosulfate.

In yet another embodiment, the sulfites and bisulfites supplied to the first contact zone are supplied as sulfites of one or more of metal cations. The cations may be from the family of ammonia, alkaline metals, alkaline earth metals, and other metals whose presence is not objectionable to the intended use of the ammonia.

In another embodiment, hydrogen sulfide is removed from an anhydrous first liquid stream, comprising hydrogen sulfide and ammonia, by passing the anhydrous first liquid stream through a porous bed selected from the group consisting of metal sulfites, metal bisulfites, and combinations thereof, wherein the hydrogen sulfide is converted to ammonium thiosulfate.

DETAILED DESCRIPTION

Figure 1:
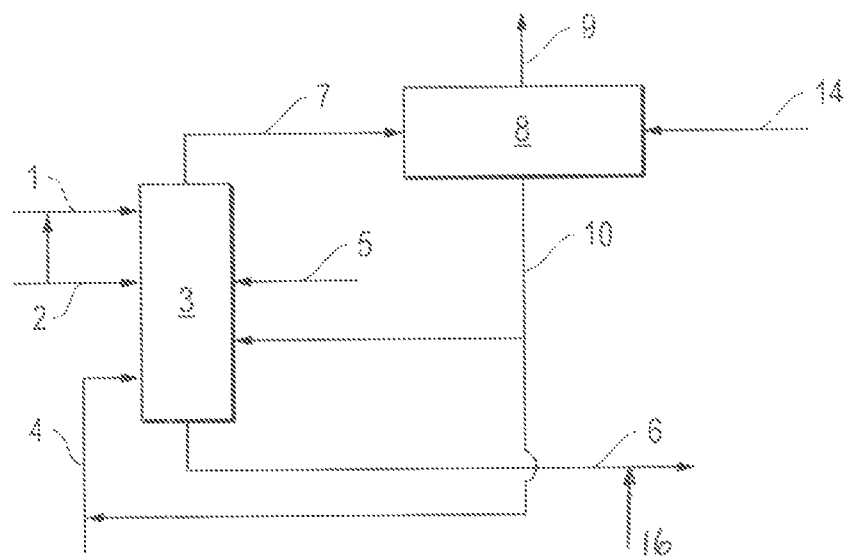
FIG. 1 is a schematic diagram of one embodiment of the process.

Waste water containing ammonia and hydrogen sulfide ("sour water") is incidentally produced in commercial processes such as petroleum refining, gasification of various carbon-containing materials such as coal, petroleum coke, and heavy oils, and by anaerobic digestion of organic wastes, such as manure. Because of the toxicity of the hydrogen sulfide, the sour water must be treated to remove the hydrogen sulfide before discharge or reuse. hydrogen sulfide is typically removed from the sour water by distillation. This process also removes most of any ammonia also present in the sour water in a vapor mixture with the hydrogen sulfide ("sour water stripper gas").

The sour water stripper gas may be further treated by feeding it to a Claus process, in which the hydrogen sulfide is converted to and recovered as elemental sulfur, or preferably, by feeding it to the ThioSolv™ SWAATS™ process wherein both ammonia and hydrogen sulfide are converted to ammonium thiosulfate solution, an article of commerce used primarily as a fertilizer.

An alternate process for treating the sour water exploits the well-known principle that Henry's constant of hydrogen sulfide over water rises more rapidly with temperature than the Henry's constant of ammonia. The process is to distill the sour water in two steps under elevated pressure, so that the volatility of hydrogen sulfide is much higher than that of ammonia. The first distillation produces a first overhead product stream comprising most of the hydrogen sulfide from the sour water and a minor concentration of ammonia and an aqueous bottom stream containing most of the ammonia present in the sour water and a relatively small amount of hydrogen sulfide. The first overhead product stream is then fed to a sulfur recovery process, such as a Claus unit. The aqueous bottom stream is fed to a second distillation step that produces a second bottom product water stream with the concentration of ammonia reduced to render it suitable for discharge or reuse and a second overhead vapor stream comprising ammonia and a small concentration of hydrogen sulfide. The overhead product stream from the second fractionation step is typically further processed by compression and extractive distillation to produce an aqueous ammonia or liquid anhydrous ammonia product containing some hydrogen sulfide. Further processing may be used to reduce the concentration of hydrogen sulfide in the produced ammonia.

However, it is not economically feasible to eliminate the hydrogen sulfide from the ammonia product by recycle and distillation. Hence, the ammonia product contains a small concentration of hydrogen sulfide (from a few parts per million to a few percent by weight), and is, therefore, not acceptable for many of the uses for ammonia not containing hydrogen sulfide. The ammonia product contaminated with hydrogen sulfide is sold at a substantial discount compared to the current market price of pure ammonia, the discount typically increasing with the concentration of hydrogen sulfide. The contaminated ammonia may be burned to recover its heating value, though sulfur dioxide must be captured to meet emission standards. Alternatively, the contaminated ammonia, in either anhydrous or aqueous phase, as mentioned earlier, may be sold at a substantial discount to market price. Also, if not for the residual hydrogen sulfide, the ammonia product would be suitable for use as fertilizer. Current processes for hydrogen sulfide removal are usually not economically feasible when compared with synthetic ammonia free of hydrogen sulfide.

The one or more embodiments of the invention provide an economically efficient process for treating a liquid, either anhydrous or aqueous, comprising ammonia ($NH_3$) and hydrogen sulfide ($H_2S$)—"sour ammonia". In the one or more embodiments of the invention, a solution comprising sulfur dioxide ($SO_2$) reacts with the sour ammonia to convert hydrogen sulfide to ammonium thiosulfate (($NH_4$)$_2S_2O_3$) (as thiosulfate and ammonium ions in solution) according to the following reactions:

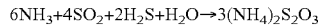

$6NH_3 + 4SO_2 + 2H_2S + H_2O \rightarrow 3(NH_4)_2S_2O_3$

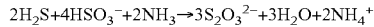

$2H_2S + 4HSO_3^- + 2NH_3 \rightarrow 3S_2O_3^{2-} + 3H_2O + 2NH_4^+$

The hydrogen sulfide is thus converted to a non hazardous material. Additionally, ammonium thiosulfate, ammonia, and the combinations thereof are marketable products.

FIG. 1 depicts a process for removing hydrogen sulfide from a liquid comprising hydrogen sulfide and ammonia in accordance with one or more embodiments of the invention. The process comprises contacting a first liquid stream 1 with a second stream 4 in a first contact zone 3. In one or more embodiments, a fresh ammonia stream 2, either aqueous or gaseous, may be added to at least one of the first liquid stream 1 and first contact zone 3. As described herein, the term contact zone may include any combination of towers, columns, trays, vessels, pumps, valves, control systems, and any other equipment known in the art useful in contacting liquids and gases. The first liquid stream 1 may comprise hydrogen sulfide and ammonia in either anhydrous or aqueous form. The second stream 4 may comprise sulfur dioxide in either liquid or gaseous form or sulfite and bisulfite ions in solution. The ammonia and hydrogen sulfide react with the sulfur dioxide and bisulfite ions in the first contact zone 3 to form ammonium thiosulfate. The first contact zone liquid effluent 6 may comprise ammonium thiosulfate and ammonia. The first contact zone overhead gas 7 may comprise ammonia, sulfur dioxide, and insoluble gases that may have been present in the second stream 4.

Sulfur dioxide may be added to ammonia by one of many means, including, co- and countercurrent contacting equipment, venturi scrubbers, or any means known in the art of bringing the sulfur dioxide into contact with the solution.

The reaction by which hydrogen sulfide is converted to thiosulfate consumes one-half mol of water per mol of sulfide reacted. Thus, if the first liquid stream 1 and second stream 4 are anhydrous, water 5 is also added to the first contact zone 3. Water may also be added to the first contact zone 3 to prevent precipitation of ammonium thiosulfate salt or to provide a desired dilution of the product. The product solution comprising ammonia and ammonium thiosulfate is yielded as a first contact zone liquid effluent 6. The ratio of sulfur to nitrogen in the first contact zone liquid effluent 6 may be further increased by adding ammonium thiosulfate 16.

The first contact zone overhead gas 7 may be sent to a second contact zone 8 where it is washed with a scrubbing solution 14. The scrubbing solution 14 may comprise at least one of water and a dilute ammonium sulfite solution. The second contact zone 8 produces an second contact zone overhead gas 9 and a second contact zone liquid effluent 10 comprising ammonium sulfite and ammonium bisulfite. This second contact zone liquid effluent 10 may be recycled to the first contact zone 3. For example, in one or more embodiments, the second contact zone liquid effluent 10 may be recycled to the first contact zone 3 either directly or via the second stream 4.

Figure 2:
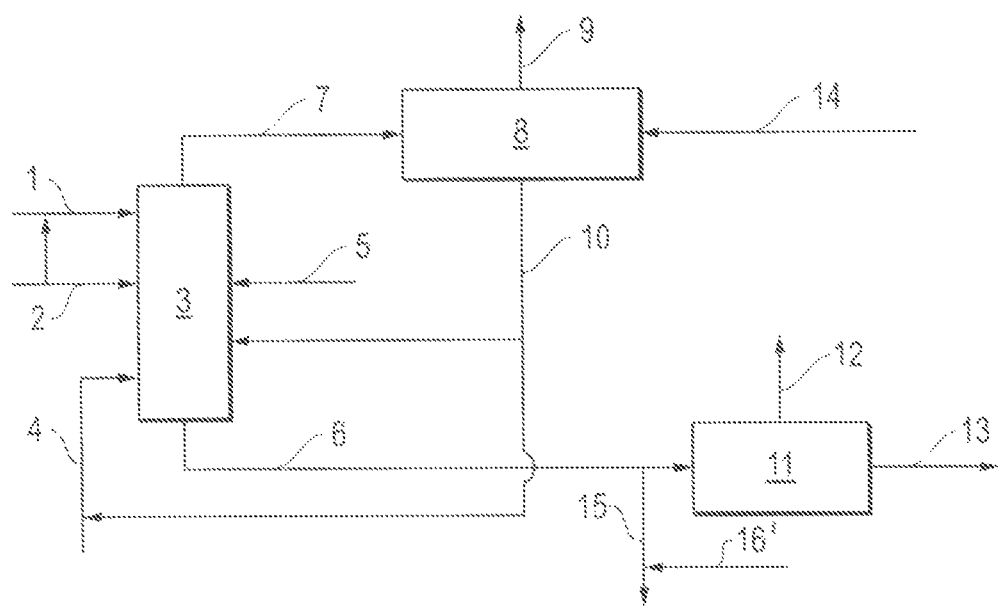
FIG. 2 is a schematic diagram of another embodiment of the process.

In a preferred embodiment, referring to FIG. 2, the first contact zone liquid effluent 6, comprising ammonia and ammonium thiosulfate, may be sent to an evaporator 11 to separate ammonia that is now substantially free of hydrogen sulfide, as a gas 12 from ammonium thiosulfate in liquid form 13.

In one or more embodiments of the invention, the ratio of ammonium thiosulfate to ammonia in the first contact zone liquid effluent 6 exiting the first contact zone 3 may be increased by increasing the concentration of hydrogen sulfide in the first liquid stream 1. For example, the concentration may be increased either by adding hydrogen sulfide to the first liquid stream 1 or by reducing the separation of hydrogen sulfide from the first liquid stream 1 in a preceding distillation step. Thus, an aqueous solution of ammonia and ammonium thiosulfate comprising about 20% nitrogen and 5% sulfur by weight may be produced. Such a composition has commercial value as a fertilizer. Before the first contact zone liquid effluent 6 enters an evaporator 11, or an equivalent separator, there may be a product takeoff 15, for use in fertilizer products. The ratio of sulfur to nitrogen in the product takeoff 15 may be further increased by adding ammonium thiosulfate 16'.

In one or more embodiments, especially applicable when the concentration of hydrogen sulfide in the first liquid stream 1 is low and the objective is to remove the hydrogen sulfide contaminant, the first liquid stream 1 may be contacted by passing it through a solid bisulfite contained in a vessel as a porous bed of solid granular or crystalline salt (not shown).

In one or more embodiments, sulfite and bisulfite ions are delivered to the first contact zone 3 as an aqueous solution of metal sulfites and bisulfites. These metals may be of the group of ammonia, alkaline metals, alkaline earth metals, and other metals whose presence in the ammonia is not objectionable to the intended use of the product.

While the invention has been described with respect to a particular number of embodiments, those having ordinary skill in the art will understand that numerous other embodiments involving variations or modifications to the systems and processes described are also within the scope of the invention.

What is claimed is:

1. A process for selectively eliminating hydrogen sulfide from a liquid comprising:
   contacting, in a first contact zone, a first liquid stream comprising ammonia and hydrogen sulfide with a second stream comprising sulfur dioxide, and
   contacting a first contact zone overhead gas with a scrub solution in a second contact zone to produce a second contact zone liquid effluent comprising ammonium sulfite and ammonium bisulfite and a second contact zone overhead gas,
   the first contact zone overhead gas comprises sulfur dioxide and ammonia,
   the second contact zone overhead gas has a reduced concentration of ammonia and sulfur dioxide, and
   the first contact zone produces a first contact zone liquid effluent comprising ammonia and ammonium thiosulfate.

2. The process of claim 1 further comprising supplying water to the first contact zone.

3. The process of claim 1 further comprising supplying the second contact zone liquid effluent to the first contact zone.

4. The process of claim 1 further comprising directing the first contact zone liquid effluent to an evaporator, the evaporator separating the first contact zone liquid effluent into an evaporator overhead gas comprising ammonia substantially free of hydrogen sulfide and an evaporator liquid effluent comprising ammonium thiosulfate.

5. The process of claim 1, wherein the first liquid stream comprising ammonia and hydrogen sulfide is an aqueous solution.

6. The process of claim 1 further comprising controlling a ratio of ammonium thiosulfate to ammonia in the first contact zone liquid effluent by increasing the concentration of hydrogen sulfide in the first liquid stream.

7. The process of claim 6, the increasing the concentration of hydrogen sulfide in the first liquid stream further comprising reducing a separation of hydrogen sulfide from the first liquid stream in a preceding distillation step.

8. The process of claim 1 comprising increasing the ratio of sulfur to nitrogen in the first contact zone liquid effluent by adding ammonium thiosulfate.

9. The process of claim 1, wherein the sulfur dioxide of the second stream is supplied in the form of at least one of sulfites and bisulfites.

10. The process of claim 9, wherein the at least one of sulfites and bisulfites is supplied as at least one of sulfites and bisulfites of one or more cations from the group consisting of ammonia, alkaline metals and alkaline earth metals.

11. A process for removing hydrogen sulfide from anhydrous ammonia by passing a first liquid stream comprising ammonia and hydrogen sulfide through a porous bed selected from the group consisting of metal sulfites, bisulfites and combinations thereof, wherein the hydrogen sulfide is converted to ammonium thiosulfate.

\* \* \* \* \*